United States Patent
Accot

(10) Patent No.: US 7,398,477 B2
(45) Date of Patent: Jul. 8, 2008

(54) SPIRAL SCROLLBAR

(75) Inventor: Johnny I. Accot, Lost Altos Hills, CA (US)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 10/699,380

(22) Filed: Oct. 31, 2003

(65) Prior Publication Data

US 2005/0097474 A1    May 5, 2005

(51) Int. Cl.
  G06F 3/048    (2006.01)
(52) U.S. Cl. .................. 715/786; 715/784; 715/863
(58) Field of Classification Search .............. 715/834, 715/830, 764, 786, 856, 863; 395/159; 345/764
  See application file for complete search history.

(56) References Cited

U.S. PATENT DOCUMENTS

| | | | | |
|---|---|---|---|---|
| 5,392,388 | A * | 2/1995 | Gibson | 715/837 |
| 5,615,325 | A | 3/1997 | Penden | |
| 5,701,424 | A * | 12/1997 | Atkinson | 715/808 |
| 5,706,448 | A | 1/1998 | Blades | |
| 5,745,717 | A | 4/1998 | Vayda et al. | |
| 5,940,076 | A * | 8/1999 | Sommers et al. | 715/834 |
| 5,977,974 | A * | 11/1999 | Hatori et al. | 715/839 |
| 5,995,079 | A | 11/1999 | Sheasby et al. | |
| 6,104,400 | A | 8/2000 | Halachmi et al. | |
| 6,369,837 | B1 * | 4/2002 | Schirmer | 715/764 |
| 6,819,344 | B2 * | 11/2004 | Robbins | 715/848 |
| 7,036,091 | B1 * | 4/2006 | Nguyen | 715/834 |
| 2002/0033848 | A1 | 3/2002 | Sciammarella et al. | |
| 2002/0054158 | A1 | 5/2002 | Asami | |
| 2002/0063737 | A1 * | 5/2002 | Feig et al. | 345/786 |
| 2002/0101458 | A1 | 8/2002 | SanGiovanni | |
| 2002/0122072 | A1 | 9/2002 | Selker | |
| 2007/0260994 | A1 * | 11/2007 | Sciammarella et al. | 715/769 |

OTHER PUBLICATIONS

"Object-Tree Within A Pie Menu", Research Disclosure, Jul. 1990, No. 315, Kenneth Mason Publications Ltd., England, 1 page.

"Radial Scale Object", IBM Technical Disclosure Bullein, vol. 38, No. 7, Jul. 1995, pp. 533-535.

"The Cost-of-Knowledge Characteristic Function: Display Evaluation for Direct-Walk Dynamic Information Visualizations", Stuart K. Card, Peter Pirolli, Jack D. Mackinlay, Proceedings of the ACM Conference on Human Factors in Computing Systems, Boston, Apr. 24-28, 1994, 8 pages.

(Continued)

Primary Examiner—Stephen Hong
Assistant Examiner—Omar Abdul-Ali
(74) Attorney, Agent, or Firm—Gibb & Rahman, LLC

(57) ABSTRACT

A method and structure for a graphic user interface comprising a non-linear path region that corresponds to a list of items in a computer application, wherein a length of the path region is directly proportional to an amount of items in the list, a rotatable handle region that corresponds to a subset of the items in the list, a display region that displays the subset, and a handle manipulator for maneuvering the handle region, wherein the non-linear path region comprises a spiral, square, or rectangular configuration, wherein each of the items in the list is represented by a fixed proportion of the path region, wherein the handle region is proportional to a fixed proportion of the path region, and wherein the fixed proportion is a fixed angle.

34 Claims, 3 Drawing Sheets

OTHER PUBLICATIONS

"3D or not 3D: 'more is better' or 'less is more'? (panel session)", Conference on Human Factors in Computing Systems, Denver, Colorado, Kevin Mullet, 1995, pp. 174-175.

"Collapsible cyndrical trees: a fast hierarchial navigation technique", 2002 IEEE Explore, R. Dachselt, J. Ebert, Dredsen University of Technology, 9 pages.

* cited by examiner

SPIRAL SCROLLBAR

BACKGROUND OF THE INVENTION

1. Field of the Invention

The invention generally relates to manipulating data through a graphic user interface within a data processing system, and more particularly to a spiral scrollbar, which allows for easier navigation in the display unit of the data processing system, thereby providing easier manipulation of the data.

2. Description of the Related Art

A computer display is a finite surface that can hold only a limited and relatively small amount of visual information. When a large amount of information needs to be accessible to the user, only a fraction of the total information can be shown at a time or within a short period of time. If the user needs information that is not shown, the system must provide a way to navigate through the information space until the desired information is shown. In traditional windowing systems, navigation is accomplished by using a linear scrollbar.

A scrollbar is a well-known user interface component that is associated with a scrollable area of a display, indicating to a user that more information is available and may be accessed in a particular direction with respect to the display. The information space is seen as a linear ribbon on the display unit (i.e., computer monitor), and the window shows a fraction of that ribbon. Moreover, the scrollbar allows the user to change the portion of the ribbon that is displayed.

As such, a scrollbar may be utilized to scroll additional data into view, and most conventional scrollbars include a slider and scroll buttons. As shown in FIG. 1, a scrollbar 1 consists of two elongated nested rectangles 5, 10, the outer long rectangle (referred to in the art as a "trough") 5 represents the whole information space linearly; the inner small rectangle (referred to in the art as a "thumb" or "elevator") 10 shows the portion of the information ribbon (or document) 15 that is shown in the window 12. The scrollbar 1 also contains a pair of oppositely positioned arrows or guides 2, which are usually triangularly shaped. There is a direct linear mapping between the full document and the outer rectangle 5. One side of the rectangle 7 represents the beginning of the document, while the opposite side 9 represents the end of the document. Moving the inner rectangle 10 to either side 7, 9 will then scroll to the beginning of the document or its end. Scrollbars 1 are usually placed on one or two edges 3 of the window 12. In some implementations, the size of the inner rectangle 10 in the scrollbar 1 varies when the document size changes. For example, in Windows-based applications, for lengthy documents, the size of the inner rectangle 10 may be a thin rectangle, whereas for short documents, the size of the inner rectangle 10 may be a much thicker rectangle, which may encompass the entire length of the outer rectangle 5. For documents in Windows-based applications of average length, the inner rectangle 10 may appear as a perfect square shape. In fact, the ratio of the sizes of the inner 10 and outer 5 rectangles may give the percentage of the document 15 that is visible.

The fact that the scrollbar 1 is linear has a major consequence in design. The length of the outer rectangle 5 is limited by the size of the window 12 and of the computer (document) display 15. Because there is a direct mapping between the document 15 and the scrollbar 1, and because the size of the document 15 is not limited, when the document size increases, a fixed portion of the document 15 will be represented by an increasingly smaller area of the scrollbar 1, making visualization and manipulation very difficult.

More formally, consider an x, y coordinate system representing a window display 12 having a document 15 shown thereon. For the following illustrative purposes, and for brevity, only the y dimension will be discussed. Suppose $L_y$ denotes the total length of the document and $W_y$ denotes the size of the window 12. As shown in FIG. 1, the total length of the document 15 is not completely shown in the window display 12, rather there is a remaining portion (not shown) of the document 15, thus the length $L_y$, denotes the total length of the document 15, and not merely the length of the document 15 shown in the confined window display 12. Also, $b_y$ denotes the current position of the center of the window 12. At the beginning of the document, $y=W_y/2$. At the end of the document, $y=L_y-(W_y/2)$. For example, suppose the scrollbar 1 is fully nested inside the window 12 and also has a size $W_y$, and $c_y$ is the size of the inner rectangle 10 of the scrollbar 1 and $a_y$ is the position of the center of the inner rectangle 10, wherein $a_y$ satisfies the following constraint: $c_y/2<a_y<[W_y-(c_y/2)]$. Using these notations, the relationship between $a_y$ and $b_y$ is:

$$b_y = (L_y - W_y) \times \left[\frac{\left(a_y - \frac{c_y}{2}\right)}{(W_y - c_y)}\right] + \frac{W_y}{2}$$

When the user moves the inner rectangle 10 of the scrollbar 1 a distance da, the document will scroll by a distance:

$$db = \frac{(L_y - W_y)}{(W_y - c_y)} \times da$$

Using this formula, it is apparent that when the document size increases, the scrolling speed will also increase. For example, suppose that $L_y=4,096$ pixels, $W_y=512$ pixels, and that $c_y=64$ pixels. If the user moves the scrollbar by one pixel (da=1), the document will scroll by 8 pixels (db=8). This represents a very smooth scrolling action and corresponds to a normal scrollbar use.

However, suppose that $L_y=1,048,576$ pixels, $W_y=512$, and $c_y=64$ pixels. If the user moves the scrollbar by one pixel (da=1), the document will scroll by almost 2,340 pixels (db=2,340). This also means that a large portion of the document (2,340−512=1,828 pixels) is not shown to the user at all. The fact that the scrollbar 1 is linear and limited in size makes it impossible to scroll large documents 15, because some portions of the document will not be shown to the user.

Solutions to these problems include using the arrows 2 of the scrollbar 1 to scroll the document 15 line by line. However, this is not a viable solution because most scrollbars have a fixed scrolling unit per unit of time and scrolling through a large document would take a prohibitive amount of time (if the document scrolls by 8 pixels every 10 milliseconds, scrolling through a document of size 1,048,576 pixels would take almost 20 minutes). This is also true for function keys like PageDown or PageUp, which, although faster, would require several minutes of constant scrolling.

Another solution to the problem would be to have an analog scrollbar, instead of a digital scrollbar. The analog scrollbar would allow moving the scrollbar on instances da inferior to 1. Although such scrollbars are practically feasible by analog circuits, it would not be easy to integrate them in today's digital computers. The problem would also remain that the user would have to move the scrollbar very small distances to be able to view all portions of a very large document. The distances may even be smaller than the resolution of the human motor control system, preventing any efficient navigation.

Spiral designs have been used previously for interacting with computers. For example, in U.S. Pat. No. 5,995,079 issued to Sheasby et al. on Nov. 30, 1999, the complete disclosure of which is herein incorporated by reference, discloses a spiral used to dynamically change a variable value, and whereby a linear scrollbar is used to show the current value. A second example of spiral designs is the technique of pie menus, which organize items in a circle. When there are many items, the problem of having too many items to display appears. Pie menus use a spiral scrolling technique, but there is no graphical spiral; the user just makes a circular motion around a point, which is interpreted as a command to rotate the menu items.

The limitation of traditional scrollbars comes from the fact that they are linear. Therefore, there is a need for a new and improved non-linear scrollbar, which overcomes the deficiencies of the conventional scrollbars, which allows for easy navigation through a document, and which can be easily integrated in current computer systems.

SUMMARY OF THE INVENTION

The invention provides a graphic user interface comprising a non-linear path region that corresponds to a list of items in a computer application; and a rotatable handle region that corresponds to a subset of the items in the list. The invention further comprises a display region that displays the subset and a handle manipulator for maneuvering the handle region. Moreover, the non-linear path region comprises a spiral configuration, a square configuration, or a rectangular configuration. Furthermore, each of the items in the list is represented by a fixed proportion of the path region and the handle region is proportional to a fixed proportion of the path region, wherein the fixed proportion is a fixed angle. Additionally, a length of the path region is directly proportional to an amount of items in the list.

In another embodiment, the invention provides a non-linear scrollbar comprising a non-linear trough that corresponds to a list of items in a computer application, a rotatable thumb that corresponds to an accessed portion of the list of items, and a partition region that corresponds to predetermined transitions between items in the list, wherein as the thumb rotates, the list of items rotate correspondingly. The non-linear scrollbar further comprises a handle manipulator for maneuvering the rotatable thumb. Moreover, the non-linear scrollbar comprises a spiral configuration, a square configuration, or a rectangular configuration. Furthermore, each of the items in the list are represented by a fixed proportion of the non-linear scrollbar and the rotatable thumb is proportional to a fixed proportion of the non-linear scrollbar, wherein the fixed proportion is a fixed angle. Also, the length of the non-linear scrollbar is directly proportional to an amount of items in the list and the list of items are arranged and displayed circumferentially around a perimeter of the non-linear scrollbar.

According to another embodiment of the invention, a method of manipulating data through a graphical user interface comprises corresponding a non-linear scrollbar to a list of items in a computer application, corresponding a rotatable region to an accessed portion of the list of items, and corresponding a partition region to predetermined transitions between items in the list. The method further comprises using a handle manipulator for maneuvering the rotatable region.

These, and other aspects and advantages of the invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

Figure 1:
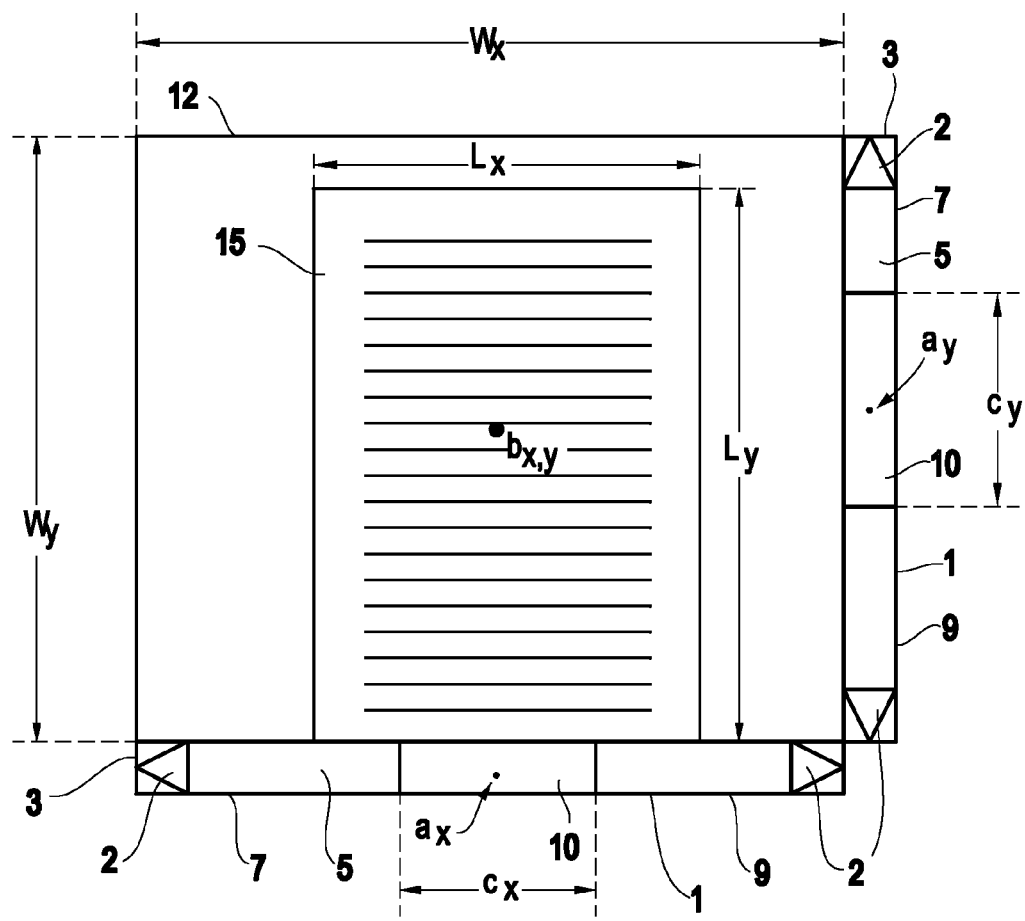
FIG. 1 is a schematic diagram of a conventional scrollbar system in use.

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

Figure 2A:
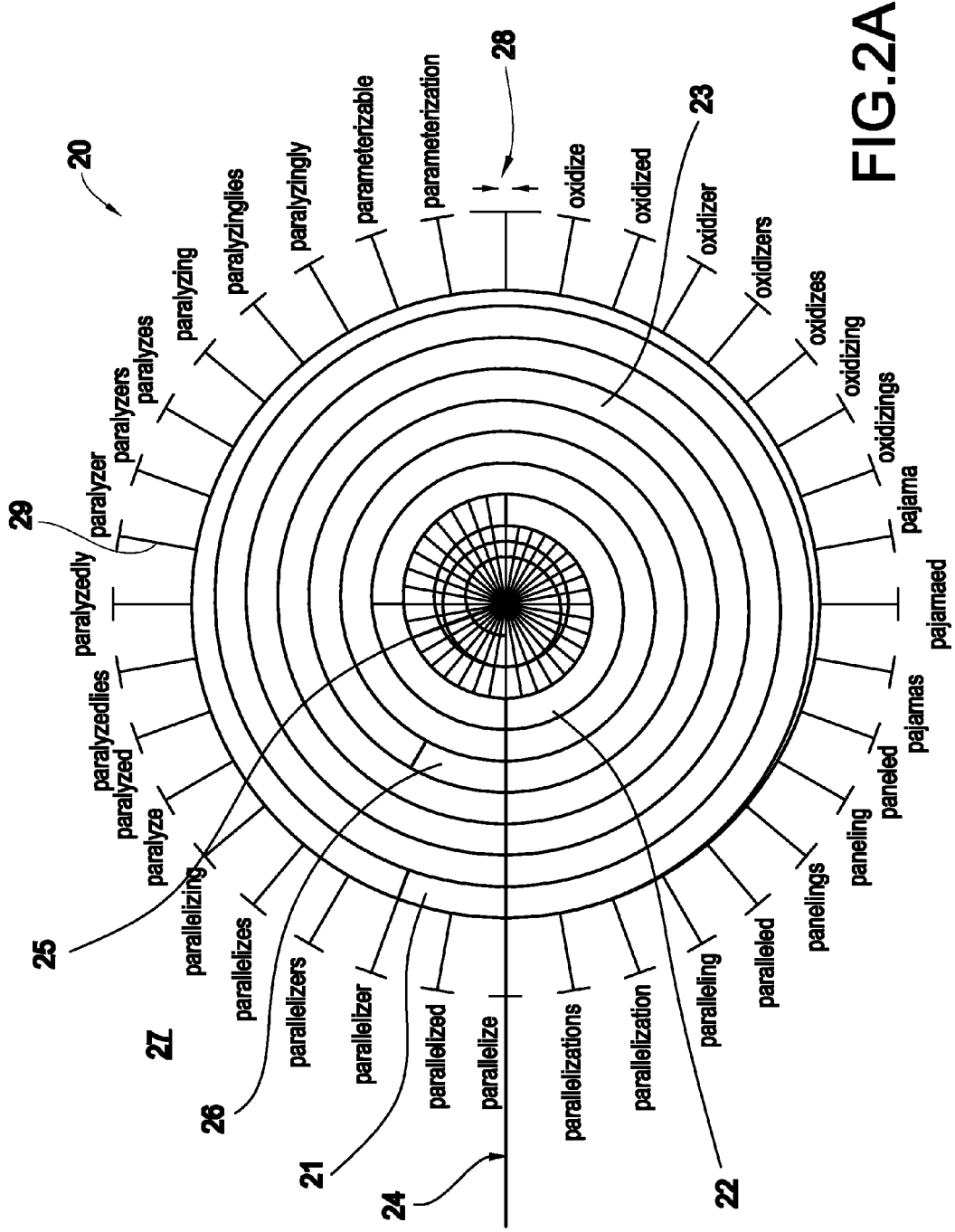
FIG. 2(a) is a schematic diagram of an embodiment of a non-linear scrollbar according to the invention.
Figure 2B:
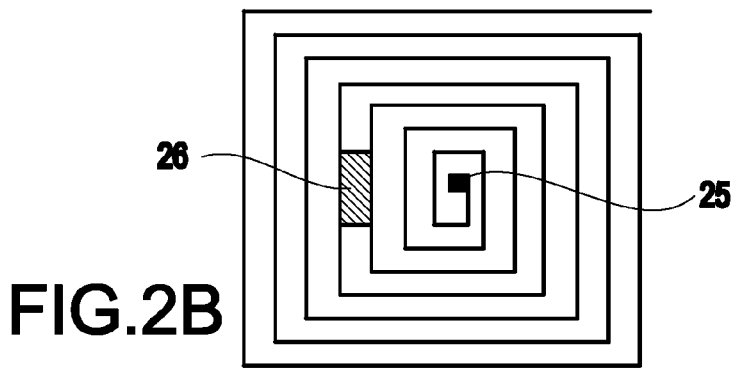
FIG. 2(b) is a schematic diagram of an alternative embodiment of a non-linear scrollbar according to the invention.
Figure 2C:
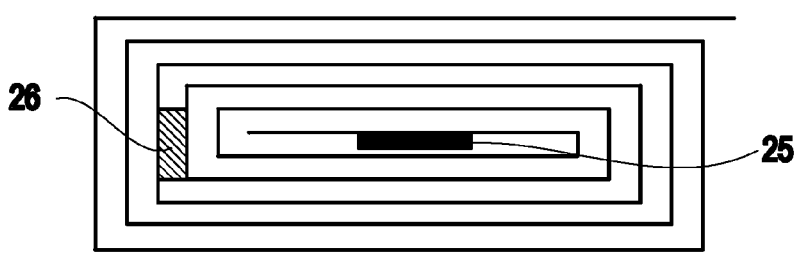
FIG. 2(c) is a schematic diagram of an alternative embodiment of a non-linear scrollbar according to the invention.
Figure 3:
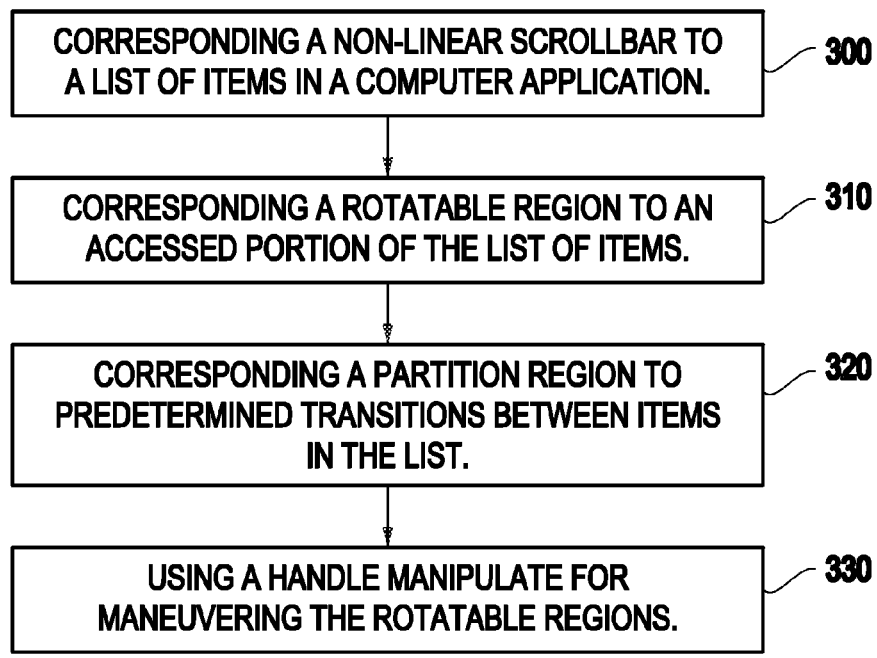
FIG. 3 is a flow diagram illustrating a preferred method of the invention.

As mentioned, the limitation of traditional scrollbars comes from the fact that they are linear. The essence of the invention is an improved scrollbar design that is non-linear and that can "roll" to accommodate the total length of the document. A preferred embodiment of the invention is a nonlinear spiral scrollbar as illustrated in FIGS. 2(a)-3. The scrollbar provided by the invention incorporates the feature that as the document size increases, the length of the scrollbar increases in the same proportion, and allows for easier control and viewing of documents, especially lengthy documents.

FIG. 2(a) shows an example of a spiral scrollbar according to an embodiment of the invention. The scrollbar 20 depicted shows an example of scrolling through a list of file names stored on a computer system directory. The inner side of the spiral 22 corresponds to the first saved files in alphabetical order, while the outer side of the spiral 21 corresponds to the last saved files. A first sector 27 of the spiral shows the current portion of the filelist that is displayed. A second sector 29 of the spiral shows the transitions between filenames letters, for instance when the first letter of the file name changes from "c" to "d". In the example shown in FIG. 2(a), the items being viewed are names of files in a filelist displayed in a computer directory (e.g., names of saved files). Thus, the first sector 27 displays these filenames circumferentially around the scrollbar 20. However, if a document is being viewed, for example a word processing document or a graphic image, then no display would be shown in the first sector 27. As the user rotates the thumb 26 around the center 25, which is positioned in the trough 23 of the scrollbar 20, the file names in the first sector 27 rotate, hiding some file names at the bottom and showing new file names at the top, for instance. As in traditional scrollbars, the user can use arrow buttons 28 to scroll line by line if desired. When using the arrow buttons, the first sector 26 moves to show the current portion of the list that is displayed. Typically, the thumb 26 is moved by simply placing the mouse cursor (not shown) over the thumb 26 and moving it in a desired manner circumferentially. However, the thumb 26 may also be maneuvered by simply pushing a thumb manipulator 24, which is graphically displayed simply as a line extending from the edge of the thumb 26.

In a preferred embodiment, the invention operates by scrolling along a non-linear spiral path. However, alternative embodiments may include other configurations such as a square or rectangular configuration illustrated in FIGS. 2(*b*) and 2(*c*) respectively, or any other non-linear configuration. An example of the invention in use is as follows. Suppose one had a file directory containing over 1,000 filenames. A conventional scrollbar 1 would linearly move from the first filename sequentially until it reached the last filename. In such a lengthy application, if a user were to manipulate the thumb 10 with a mouse, for example, in a click and drag fashion, then even a one pixel move on the computer screen 12 would result in jumping from, for example, the first filename all the way to perhaps the fiftieth filename. The only practical way to view a filename in between the first and fiftieth positions would be to use the up and down arrows 2 in a very methodical and slow manner. It is obvious that in a lengthy document, application, list of items, etc., such a mode of searching and retrieving is not efficient. Therefore, the scrollbar 20 according to the invention reduces the impracticality of searching lengthy documents, applications, lists of files, etc. as each transition from one filename to another is partitioned by the second sector 29 (in the example of a file directory), and the spiral scrollbar 20 allows for either slow or quick movement through the list of filenames depending on whether the thumb manipulator 24 is used toward the inner portion 22 (quick movement through the list of files) of the scrollbar 20 or toward the outer portion (i.e., near the first sector 27) of the scrollbar 20 (slow movement through the list of files).

Unlike traditional linear scrollbars, the length of the spiral scrollbar is not fixed but depends directly upon the total number of files in the folder. Thus, if there are few files in the directory, the spiral will be shorter. On the contrary, if there are many files, the spiral will grow (and possibly get thinner) to accommodate the greater size of the information space.

For example, practically, each file is represented by a fixed angle, for instance by a sector of 1 degree. Thus, if 50 files are shown, the thumb 26 will then extend over 50 degrees. Whereas, if there are 1,000 files, the spiral 20 itself will roll over 1,000 degrees, that is it makes almost 3 turns around the center 25 of the scrollbar. This also has an advantage over linear scrollbars as it allows for more controlled movement of the thumb 26 as previously described.

Regardless of the number of items in the folder, a scrolling motion of any given amplitude will s result in the same number of files disappearing on one side and appearing on the other side. For instance, if the user makes one complete turn of the spiral, 360 files will appear/disappear if each file is represented by one degree. Similarly, 180 files will appear/disappear if each file is represented by two degrees, and so on. However, this is not true for linear scrollbars, where a given scrolling motion will result in the document scrolling an amount related to the document size. Thus, the spiral scrollbar 20 can increase the consistency of the user experience when scrolling. For example, as the user progresses in his/her use of the scrollbar 20 the user will learn to increase his/her precision (i.e., how quickly or slowly to move the thumb 26) by using the thumb manipulator 24 either closer to the center 25 or further away.

The invention can be used for many purposes. For example, it has been shown that a major difference between a mouse and a stylus is that it is much easier to draw circles with a pen than with a mouse, and it is much easier to draw straight lines with a mouse than with a pen. The spiral scrolling technique is very well suited for pen-based computing. In fact, human ergonomics suggest as much.

As mentioned, spiral designs have been used previously for interacting with computers. For example, in U.S. Pat. No. 5,995,079 issued to Sheasby et al. on Nov. 30, 1999, the complete disclosure of which is herein incorporated by reference, discloses a spiral used to dynamically change a variable value, and whereby a linear scrollbar is used to show the current value. The present invention differs from this conventional method in that the invention does not change a variable but rather navigates through a given list of items. According to the invention, there is also a rigorous correspondence with the graphical spiral and the scrolling behavior, captured by the first sector in the spiral scrollbar.

A second example previously mentioned is the technique of pie menus, which organize items in a circle. When there are many items, the problem of having too many items to display appears. Pie menus use a spiral scrolling technique, but there is no graphical spiral; the user just makes a circular motion around a point, which is interpreted as a command to rotate the menu items. Conversely, the present invention is based on the explicit display of the spiral scrollbar, whose length is related to the number of items available, and a sector that shows which portion of the list is currently shown.

The invention essentially provides a graphic user interface 20 comprising a non-linear path region 23 that corresponds to a list of items in a computer application; and a rotatable handle region 26 that corresponds to a subset of the items in the list. The invention further comprises a display region 27 that displays the subset and a handle manipulator 24 for maneuvering the handle region 26. Moreover, the non-linear path region 23 comprises a spiral configuration, a square configuration, or a rectangular configuration. Furthermore, each of the items in the list is represented by a fixed proportion of the path region 23 and the handle region 26 is proportional to a fixed proportion of the path region 23, wherein the fixed proportion is a fixed angle. Additionally, a length of the path region 23 is directly proportional to an amount of items in the list.

In another embodiment, the invention provides a non-linear scrollbar 20 comprising a non-linear trough 23 that corresponds to a list of items in a computer application, a rotatable thumb 26 that corresponds to an accessed portion of the list of items, and a partition region 29 that corresponds to predetermined transitions between items in the list, wherein as the thumb 26 rotates, the list of items rotate correspondingly. The non-linear scrollbar further comprises a handle manipulator 24 for maneuvering the rotatable thumb 26. Moreover, the non-linear scrollbar 20 comprises a spiral configuration, a square configuration, or a rectangular configuration. Furthermore, each of the items in the list is represented by a fixed proportion of the non-linear scrollbar 20 and the rotatable thumb 26 is proportional to a fixed proportion of the non-linear scrollbar 20, wherein the fixed proportion is a fixed angle. Also, the length of the non-linear scrollbar 20 is directly proportional to an amount of items in the list and the list of items are arranged and displayed circumferentially around a perimeter of the non-linear scrollbar 20.

According to another embodiment of the invention illustrated in the flow diagram of FIG. 3, a method of manipulating data through a graphical user interface comprises corresponding 300 a non-linear scrollbar 20 to a list of items in a computer application, corresponding 310 a rotatable region 26 to an accessed portion of the list of items, and corresponding 320 a partition region 29 to predetermined transitions between items in the list. The method further comprises using 330 a handle manipulator 24 for maneuvering the rotatable region 26.

While the invention has been described in terms of preferred embodiments, those skilled in the art will recognize that the invention can be practiced with modification within the spirit and scope of the appended claims.

What is claimed is:

1. A method of displaying a spiral scrollbar, said method comprising:
    corresponding an entire ordered list of items in a computer application to a spiral trough of said spiral scrollbar, wherein a central region of said spiral trough corresponds to one end of said entire ordered list and an outermost region of said spiral trough corresponds to another end of said entire ordered list; and
    corresponding a thumb region located on a portion of said spiral trough to a subset of contiguous items of said entire ordered list, wherein rotating said thumb region inwardly on said spiral trough allows more rapid scrolling through said entire ordered list, when compared to rotating said thumb region outwardly.

2. The method of claim 1, all the limitations of which are incorporated herein by reference, wherein said spiral trough comprises a smooth spiral configuration.

3. The method of claim 1, all the limitations of which are incorporated herein by reference, wherein said spiral trough comprises a spiral configuration including right angles.

4. The method of claim 1, all the limitations of which are incorporated herein by reference, wherein each item of said entire ordered list of items is represented by a fixed proportion of a length of said spiral trough.

5. The method of claim 1, all the limitations of which are incorporated herein by reference, wherein said thumb region is proportional to a fixed proportion of a length of said spiral trough.

6. The method of claim 4, all the limitations of which are incorporated herein by reference, wherein the fixed proportion corresponds to a fixed angle.

7. The method of claim 1, all the limitations of which are incorporated herein by reference, wherein a total length of said spiral trough is directly proportional to a number of items in the entire ordered list.

8. The method of claim 1, all the limitations of which are incorporated herein by reference, further comprising displaying the subset of contiguous items of said entire ordered list around said spiral trough.

9. The method of claim 1, all the limitations of which are incorporated herein by reference, further comprising rotating said thumb region along said spiral trough by a thumb manipulator.

10. A method of displaying a spiral scrollbar, said method comprising:
    corresponding an entire ordered list of items to a spiraling trough, progressively winding tighter from an outer periphery region towards a geometric center of said spiraling trough, wherein said spiraling trough comprises:
        at least one of an outerside region, corresponding to one end of said entire ordered list, or an innerside region, corresponding to another end of said entire ordered list; and
        a thumb region, corresponding to a subset of contiguous items of said entire ordered list, wherein said thumb region is located inwardly from said outerside region and outwardly from said innerside region;
    corresponding a rotatable thumb to a portion of the entire ordered list of items, wherein said rotatable thumb is locatable anywhere between said geometric center and said outer periphery region;
    manipulating a thumb manipulator to rotate the rotatable thumb, wherein rotating said thumb manipulator inwardly on said spiraling trough allows more rapid scrolling through said entire ordered list, when compared to rotating said rotatable thumb manipulator outwardly; and
    displaying said spiraling trough, said thumb manipulator, and said rotatable thumb on said graphical user interface.

11. The method of claim 10, all the limitations of which are incorporated herein by reference, wherein as the rotatable thumb rotates, a display of said subset of contiguous items of said entire ordered list of items changes correspondingly.

12. The method of claim 10, all the limitations of which are incorporated herein by reference, wherein the spiraling trough comprises a smooth spiral configuration.

13. The method of claim 10, all the limitations of which are incorporated herein by reference, wherein the spiraling trough comprises a spiral configuration including right angles.

14. The method of claim 10, all the limitations of which are incorporated herein by reference, wherein each item of said entire ordered list of items is represented by a fixed proportion of a length of said spiraling trough.

15. The method of claim 10, all the limitations of which are incorporated herein by reference, wherein the thumb region is proportional to a fixed proportion of a length of said spiraling trough.

16. The method of claim 14, all the limitations of which are incorporated herein by reference, wherein the fixed proportion corresponds to a fixed angle.

17. The method of claim 10, all the limitations of which are incorporated herein by reference, wherein a total length of the spiraling trough is directly proportional to a number of items in the entire ordered list.

18. The method of claim 10, all the limitations of which are incorporated herein by reference, wherein the subset of contiguous items of said entire ordered list of items is displayed circumferentially around a perimeter of the spiral scrollbar.

19. A method of using a spiral scrollbar displayed on a graphical user interface, said method comprising:
    corresponding an entire ordered list of items in a computer application to a spiral trough of said spiral scrollbar, wherein a central region of said spiral trough corresponds to one end of said entire ordered list and an outermost region of said spiral trough corresponds to another end of said entire ordered list; and
    corresponding a thumb region located on a portion of said spiral trough to a subset of contiguous items of said entire ordered list, wherein rotating said thumb region inwardly on said spiral trough allows more rapid scrolling through said entire ordered list, when compared to rotating said thumb region outwardly.

20. The method of claim 19, all the limitations of which are incorporated herein by reference, wherein as the thumb region is rotated, a display of the subset of contiguous items of the entire ordered list of items changes correspondingly.

21. The method of claim 19, all the limitations of which are incorporated herein by reference, wherein the spiral trough comprises a smooth spiral configuration.

22. The method of claim 19, all the limitations of which are incorporated herein by reference, wherein the spiral trough comprises a spiral configuration including right angles.

23. The method of claim 19, all the limitations of which are incorporated herein by reference, wherein each item of said entire ordered list of items is represented by a fixed proportion of a length of said spiral trough.

24. The method of claim 19, all the limitations of which are incorporated herein by reference, wherein the thumb region is proportional to a fixed proportion of a length of said spiral trough.

25. The method of claim 23, all the limitations of which are incorporated herein by reference, wherein the fixed proportion corresponds to a fixed angle.

26. The method of claim 19, all the limitations of which are incorporated herein by reference, wherein a total length of the spiral trough is directly proportional to a number of items in the entire ordered list.

27. The method of claim 19, all the limitations of which are incorporated herein by reference, wherein the subset of contiguous items of said entire ordered list of items is displayed circumferentially around a perimeter of the spiral scrollbar.

28. The method of claim 19, all the limitations of which are incorporated herein by reference, further comprising rotating said thumb region along said spiral trough by a thumb manipulator of said graphical user interface.

29. The method of claim 5, all the limitations of which are incorporated herein by reference, wherein said thumb region comprises more than one turn of said spiral trough, corresponding to an angle greater than 360 degrees.

30. The method of claim 15, all the limitations of which are incorporated herein by reference, wherein said thumb region comprises more than one turn of said spiral trough, corresponding to an angle greater than 360 degrees.

31. The method of claim 24, all the limitations of which are incorporated herein by reference, wherein said thumb region comprises more than one turn of said spiral trough, corresponding to an angle greater than 360 degrees.

32. The method of claim 1, wherein said entire ordered list of items corresponds to lines of a document.

33. The method of claim 10, wherein said entire ordered list of items corresponds to lines of a document.

34. The method of claim 19, wherein said entire ordered list of items corresponds to lines of a document.

* * * * *